US007571246B2

(12) United States Patent
Virdi et al.

(10) Patent No.: US 7,571,246 B2
(45) Date of Patent: Aug. 4, 2009

(54) MEDIA TRANSRATING OVER A BANDWIDTH-LIMITED NETWORK

(75) Inventors: Gurpratap Virdi, Bellevue, WA (US); Jeffrey A. Davis, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 840 days.

(21) Appl. No.: 10/901,612

(22) Filed: Jul. 29, 2004

(65) Prior Publication Data

US 2006/0026294 A1  Feb. 2, 2006

(51) Int. Cl.
*G06F 15/16* (2006.01)
(52) U.S. Cl. .......................... 709/232; 725/96; 725/117
(58) Field of Classification Search .......... 709/229–232
See application file for complete search history.

(56) References Cited

U.S. PATENT DOCUMENTS

| 5,392,396 | A | 2/1995 | MacInnis |
| 5,621,820 | A | 4/1997 | Rynderman et al. |
| 5,758,076 | A | 5/1998 | Wu et al. |
| 5,822,537 | A * | 10/1998 | Katseff et al. ............... 709/231 |
| 5,844,891 | A | 12/1998 | Cox |
| 5,909,443 | A | 6/1999 | Fichou et al. |
| 6,014,694 | A | 1/2000 | Aharoni et al. |
| 6,343,350 | B1 | 1/2002 | LaMaire et al. |
| 6,378,053 | B1 | 4/2002 | LaMaire et al. |
| 6,507,587 | B1 | 1/2003 | Bahl |
| 6,519,004 | B1 | 2/2003 | Bahl |
| 6,611,530 | B1 | 8/2003 | Apostolopoulos |
| 6,618,363 | B1 | 9/2003 | Bahl |
| 6,860,609 | B2 | 3/2005 | Olson et al. |
| 7,000,025 | B1 | 2/2006 | Wilson |
| 7,151,749 | B2 * | 12/2006 | Vega-Garcia et al. .... 370/241.1 |
| 7,155,532 | B2 | 12/2006 | Schoenblum |
| 7,170,856 | B1 | 1/2007 | Ho et al. |
| 7,366,199 | B1 * | 4/2008 | Vaughan et al. ............. 370/468 |
| 2002/0146023 | A1 | 10/2002 | Myers |
| 2002/0157102 | A1 | 10/2002 | Lee et al. |
| 2003/0055995 | A1 | 3/2003 | Ala-Honkola |
| 2003/0067872 | A1 | 4/2003 | Harrell et al. |
| 2003/0133446 | A1 | 7/2003 | Schoenblum |

(Continued)

FOREIGN PATENT DOCUMENTS

EP          0901285          3/1999

(Continued)

OTHER PUBLICATIONS

B. Zheng & M. Atiquzzaman "TSFD: Two Stage Frame Dropping for Scalable Video Transmission over Data Network", IEEE 2001, pp. 43-47.*

(Continued)

*Primary Examiner*—Andrew Caldwell
*Assistant Examiner*—John M MacIlwinen
(74) *Attorney, Agent, or Firm*—Lee & Hayes, PLLC

(57) ABSTRACT

A transrate manager on a host computer determines if there is a limitation in network bandwidth and controls the bit-rate of streaming media content accordingly. The bit-rate is controlled by excluding types of video frames from the streaming media content and then reintroducing excluded types of video frames back into the streaming video content once the network has recovered.

29 Claims, 7 Drawing Sheets

U.S. PATENT DOCUMENTS

| | | | |
|---|---|---|---|
| 2003/0195977 A1* | 10/2003 | Liu et al. | 709/231 |
| 2004/0193719 A1* | 9/2004 | Yang et al. | 709/229 |
| 2004/0267956 A1 | 12/2004 | Leon et al. | |
| 2005/0021830 A1* | 1/2005 | Urzaiz et al. | 709/234 |
| 2005/0047341 A1* | 3/2005 | Kim et al. | 370/232 |
| 2005/0100056 A1 | 5/2005 | Chuberre et al. | |
| 2006/0026181 A1 | 2/2006 | Glickman | |
| 2007/0022206 A1* | 1/2007 | Pope et al. | 709/231 |
| 2007/0150264 A1 | 6/2007 | Tackin et al. | |

FOREIGN PATENT DOCUMENTS

| | | |
|---|---|---|
| EP | 0987894 | 3/2000 |
| JP | 08191451 | 7/1996 |
| WO | WO0124523 | 4/2001 |
| WO | WO03026232 | 3/2003 |

OTHER PUBLICATIONS

H. Cha, J. Ha & R. Ha "Dynamic Frame Dropping for Bandwidth Control in MPEG Streaming System", Multimedia Tools and Applications, Kluwer, 19, 155-178, 2003.*

"TSFD: Two Stage Frame Dropping for Scalable Video Transmission over Data Networks", Zheng et al., IEEE, 2001, pp. 43-47.

"Rate-Reduction Transcoding Design For Wireless Video Streaming", Vetro et al., IEEE, 2002, pp. I-29 to I-32.

"Adaptive streaming of high-quality video over wireless LANs", Peter van Beek, Proceedings of the SPIE, 2004, vol. 5308, No. 1, pp. 647-660.

"Semantic Transcoding of Video based on Regions of Interest", Lim et al., Proceedings of SPIE, 2003, vol. 5150, pp. 1232-1244.

"Dynamic Frame Skipping For High-Performance Transcoding", Fung et al., IEEE, 2001, pp. 425-428.

"Optimal Temporal Sampling of Video under Channel and Buffer Constraints", Zhou et al., IEEE, 2002, pp. 401-404.

Dynamic Frame Dropping for Bandwidth Control in MPEG Streaming System, Cha et al., Multimedia Tools and Applications, 2003, No. 19, pp. 155-178.

"Real-Time Traffic Transmissions Over the Internet", Furini et al., IEEE Transactions on Multimedia, vol. 3, No. 1, Mar. 2001, pp. 33-40.

"Complexity Regulation for Real-Time Video Encoding", Zhong et al., IEEE, 2002, pp. I-737 to I-740.

Castel-Branco et al., "Clock Recovery for Circuit Emulation Services over ATM" Broadband Communications. Global Infrastructure for the Information Age. Conference on Broadband Communications, Canada, 1996, London, Chapman and Hall, GB, Apr. 23, 1996 pp. 617-625.

Wei, et al., "A Layered Real-time Video Transfer System: Architecture and Its Implementation", ACTA Electronica SINICA, vol. 28, No. 11, Nov. 2000, pp. 153-168.

Yu, H. et al., "Deisgn on internal model controller for flow control on real-time multimedia communication", Journal of China Institute of Communication, vol. 25, No. 11, Nov. 2004, pp. 90-97.

Comer, "Internetworking with TCP/IP", Prentice Hall, 1995-2000, vol. 1, pp. 3.

US 5,715,404, 02/1998, Katseff et al. (withdrawn)

* cited by examiner

MEDIA TRANSRATING OVER A BANDWIDTH-LIMITED NETWORK

TECHNICAL FIELD

The present disclosure generally relates to streaming media, and more particularly to changing the bit rate of video transmission based on network bandwidth information.

BACKGROUND

Content streaming, such as the streaming of audio, video, and/or text media content is becoming increasingly popular. The term "streaming" is typically used to indicate that the data representing the media is provided by a host computer over a network to a client computer (i.e., a media playback computer device implemented as any of a variety of conventional computing devices, such as a desktop PC, a notebook or portable computer, a cellular telephone or other wireless communications device, a personal digital assistant (PDA), a gaming console, an IP set-top box, a handheld PC, and so on), and the client computer renders the streaming content as it is received from the host, rather than waiting for an entire "file" to be delivered.

When media content is "streamed" over a network, it is typically streamed in data packets. However, there is not always a guarantee that the data packets will arrive at their destination in the same order in which they are sent, or even that they will arrive at their destination at all. Additionally, there is usually no guarantee that the time it takes a data packet to travel from the source to the destination will be of specific duration, or that the time will be the same for different data packets.

In order to account for these variances in data delivery to a client computer, the client computer typically maintains a buffer of data. This buffer allows the client computer to smooth out the variances in data delivery so that they are not as noticeable to the user during playback of the content. However, one problem with this buffering is that it may not always account for glitches in network bandwidth caused by network congestion (e.g., network cross-traffic, interference, poor wireless reception). If glitches in network bandwidth are sustained for a few seconds or more, they can exceed the ability of the client buffers to compensate, which can result in a significant adverse impact on the playback of content for the user. For example, a sustained glitch in network bandwidth can lead to a pause in the playback of video (i.e., audio/video) content on the client computer and the general inability to experience video content in real time.

One solution to such network bandwidth problems is to reduce the size (i.e., bit-rate) of the streaming content. Some current methods for reducing the bit-rate of streaming content involve the generation and storage of a number of copies of the same video content. Thus, a user or system has the option of selecting a version of video content at a lower bit-rate, reducing the chances that real time playback of video content will be interrupted by network bandwidth glitches. Another method for reducing the bit-rate of streaming content would be to perform bit-rate reduction "on-the-fly".

Although these methods can reduce the interruption of real time video playback, they have various disadvantages. For example, in the method where different bit-rate copies of the same video content are stored, selecting a playback bit-rate for video content generally occurs at the beginning of playback and usually cannot be changed during playback. A change from one bit-rate copy of video content to another may necessitate the interruption of playback and the re-initiating of playback from the beginning of the content. Another disadvantage is that significant storage space is required to maintain numerous copies of the same content on a host device. Both of the methods mentioned above suffer the additional disadvantage of being extremely processor-intensive. That is, generating different bit-rate-encoded copies of the same video content and performing bit-rate reduction "on-the-fly" are both extremely processor-intensive. Such a process, typically performed on a host device, involves a complete decode of video content into non-compressed, or raw, video. The complete decode is followed by a full encode of the raw video to recompress it with parameter adjustments that will result in a smaller overall copy of the video content.

Accordingly, a need exists for a way to deliver streaming content that makes network bandwidth glitches more transparent to the user during content playback.

SUMMARY

A transrate manager on a host computer determines if there is a limitation in network bandwidth and controls the bit-rate of streaming media content accordingly. The bit-rate is controlled by excluding types or classes of video frames from the streaming media content and then reintroducing the excluded types or classes of video frames back into the streaming video content once the network has recovered.

In one implementation, a host computer streams video (i.e., audio/video) content to a playback device and receives buffer fullness reports from the playback device. When the buffer reports indicate a media buffer (i.e., an audio buffer) on the playback device is being depleted, the transrate manager instructs a transrater to begin selectively excluding video frames from the streaming video content. Different types or classes of video frames can be excluded from the streaming video content in steps, or all at once, depending on the degree of buffer depletion. For example, certain delta video frames may be excluded in a first step (e.g., for MPEG video content, B frames are excluded first, followed by P frames if the buffer is still being depleted). The transrate manager continues to monitor buffer fullness reports. After all delta video frames (e.g., B and P delta frames) have been excluded, the transrater may also exclude certain key frames (e.g., every other "I" frame) if buffer depletion on the playback device continues. Each exclusion of certain types of video frames reduces the bit-rate of the video stream and increases the chance that key video frames will arrive at the playback device in time to sustain a real time playback experience for the user. Frames may be persisted or duplicated on the playback device to make up for excluded frames and maintain a satisfactory real time video playback experience. Audio content is not dropped from the media stream, so the audio playback is a seamless experience.

Once network bandwidth limitations have subsided, the transrate manager controls the reintroduction of excluded types of video frames back into the video stream. The general health of the network bandwidth is tested by introducing padding data packets into the media stream at an increasing rate until either the playback device buffer begins depleting again, or the previous bit-rate of the media stream is reached without further buffer depletion. If the previous bit-rate of the media stream is reached without further buffer depletion, the most recently excluded types of video frames are then reintroduced back into the video stream. This process continues until all the types of video frames in the video content are again being streamed to the playback device.

BRIEF DESCRIPTION OF THE DRAWINGS

The same reference numerals are used throughout the drawings to reference like components and features.

DETAILED DESCRIPTION

Introduction

The following discussion is directed to a system and methods that provide "on-the-fly" transration (i.e., bit-rate conversion) of streaming media content to compensate for network bandwidth limitations. Different types of video frames can be selectively excluded from the video portion of a media stream in order to maintain a real time playback experience that is not disrupted by temporary network bandwidth problems. When the network recovers, the excluded types of video frames can be reintroduced back into the media stream. Advantages of the disclosed system and methods include a video playback experience that is less interrupted by network problems and that maintains a higher quality when network bandwidth is available. Additional advantages include reduced storage and media processing requirements for host devices that maintain and distribute media content.

Exemplary Environment

Figure 1:
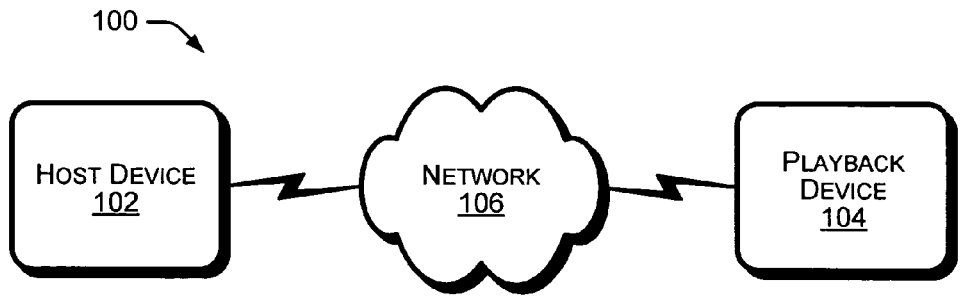
FIG. 1 illustrates an exemplary environment suitable for transrating media content being streamed over a network from a host computer device to a playback computer device.

FIG. 1 illustrates an exemplary environment 100 suitable for transrating (i.e., bit-rate converting) media content being streamed over a network 106 from a host computer device 102 to a playback computer device 104. Network 106 is intended to represent any of a variety of conventional network topologies and types (including optical, wired and/or wireless networks), employing any of a variety of conventional network protocols (including public and/or proprietary protocols). Network 106 may include, for example, a home network, a corporate network, or the Internet, as well as possibly at least portions of one or more local area networks (LANs) and/or wide area networks (WANs).

A host device 102 generally stores media content and streams media content to a playback device 104 upon request. A playback device 104 generally receives streaming media content from host device 102 and plays it back for a user. Requests from playback device 104 for streaming media content that is available on host device 102 are routed from the playback device 104 to the host device 102 via network 106. The host device 102 receives the request and returns the requested content to the requesting playback device 104 via network 106.

Host device 102 may be implemented as any of a variety of conventional computing devices, including, for example, a desktop PC, a notebook or portable computer, a workstation, a mainframe computer, an Internet appliance, combinations thereof, and so on, that are configurable to store and stream media content to a playback device 104. Playback device 104 may also be implemented as any of a variety of conventional computing devices, including, for example, a desktop PC, a notebook or portable computer, a workstation, a mainframe computer, an Internet appliance, a gaming console, a handheld PC, a cellular telephone or other wireless communications device, a personal digital assistant (PDA), a set-top box, combinations thereof, and so on. An exemplary computing environment for implementing a host device 102 and a playback device 104 is described in more detail herein below with reference to FIG. 11.

Host device 102 can make any of a variety of data available for streaming to playback device 104, including content such as audio, video, text, images, animation, and the like. However, as used herein with respect to the exemplary embodiments described below, media content 200 is intended to represent audio/video (A/V) content or just video content. Furthermore, references made herein to "media content", "streaming media", "streaming video", "video content", and any variation thereof are generally intended to include audio/video content. The term "streaming" is used to indicate that the data representing the media content is provided over a network 106 to a playback device 104 and that playback of the content can begin prior to the content being delivered in its entirety. The data may be publicly available or alternatively restricted (e.g., restricted to only certain users, available only if the appropriate fee is paid, restricted to users having access to a particular network, etc.). Additionally, the data may be "on-demand" (e.g., pre-recorded and of a known size) or alternatively "broadcast" (e.g., having no known size, such as a digital representation of a concert being captured as the concert is performed and made available for streaming shortly after capture).

Exemplary Embodiments

Figure 2:
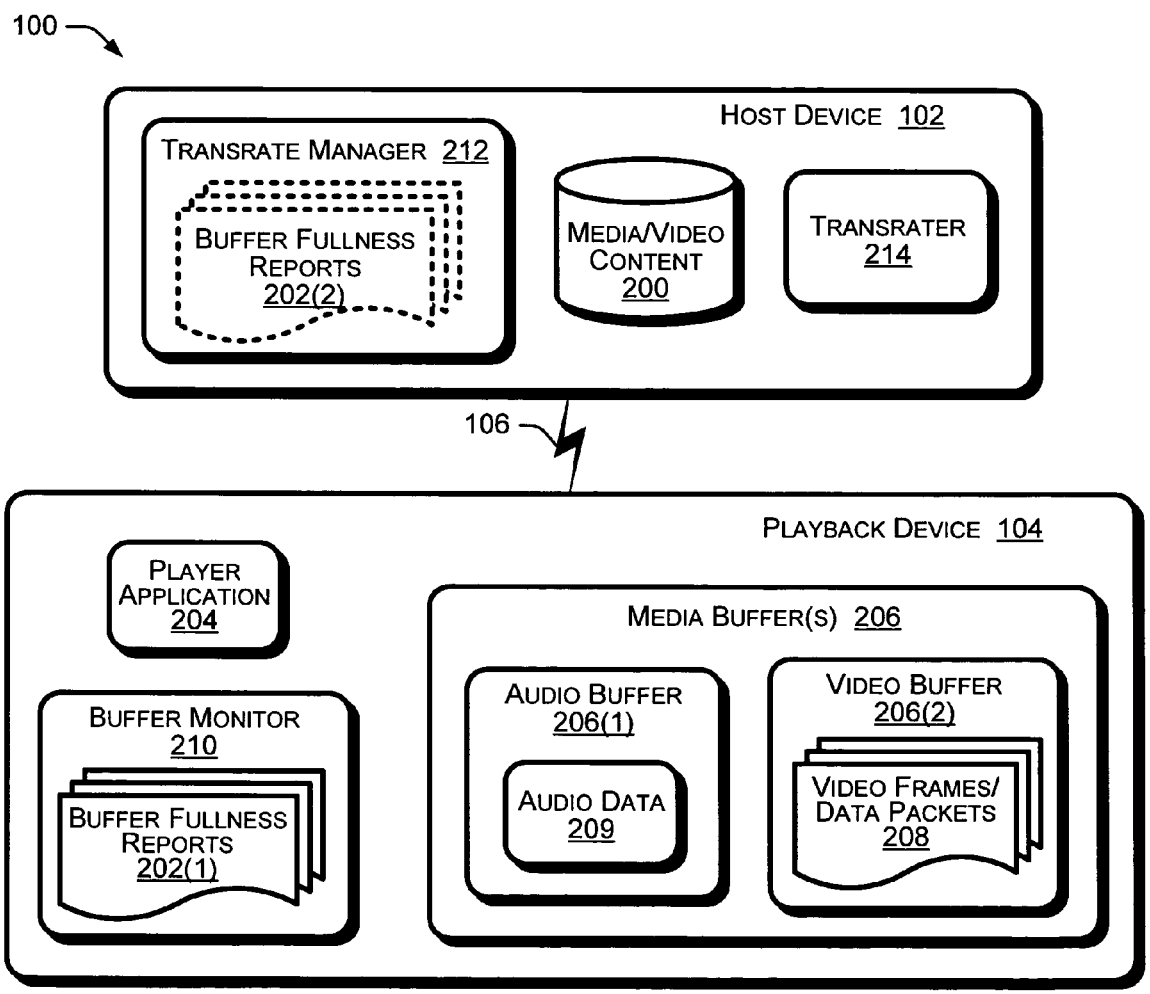
FIG. 2 illustrates an exemplary embodiment of a host device configured to stream media/video content over a network to a playback device, and to transrate a video component of the content.

FIG. 2 illustrates an exemplary embodiment of a host device 102 configured to stream media/video content 200 over a network 106 to a playback device 104, and to transrate (i.e., convert the bit-rate of) a video component of the media content 200 in response to information about network bandwidth availability. In the present embodiment, playback device 104 provides such information in the form of buffer fullness reports 202, which indicate the level of data present in a media buffer 206 (i.e., the level of audio data in an audio buffer 206(1)) on the playback device 104 during the streaming of media content to the playback device 104. It is noted that the buffer fullness reports 202 discussed herein regarding the present embodiment are intended as only one possible example of how a host device 102 might determine network bandwidth availability. Thus, other ways of providing host device 102 with information regarding network bandwidth availability are contemplated and might result in similar benefits as those discussed herein with respect to the buffer fullness reports 202.

Host device 102 maintains one or more files of media content 200 from which a selection can be made by a media player application 204 (e.g., in response to user input through player application 204) on playback device 104. In the present embodiment, media content 200 is to be considered video content that typically has an audio component. Thus, as indicated above, references made herein to "media content", "streaming media", "streaming video", "video content", and any variation thereof are generally intended to mean audio/video (A/V) and/or video content. Host device 102 transmits requested media content 200 as a stream of data over network 106 to player application 204 on playback device 104.

An example of the video portion of streaming media content 200 would be video content composed of 30 video frames per second, of which some frames are key frames (anchor frames) and some frames are delta frames. Key frames contain information to describe the entire frame. Thus, key frames are like stand-alone bitmap images that can be used to recreate the entire information for a picture. Delta frames only contain information that changes with respect to a nearby key frame or delta frame. That is, the data in a delta frame represents a change in a picture that occurs from one frame to the next frame in a video sequence. A delta frame does not represent a whole picture.

The present embodiment will be discussed using MPEG formatted video content as an example. In MPEG formatted video content, key frames are represented as "I" frames, while delta frames are represented by both "P" frames and "B" frames. I frames are "intra" frames and, as key frames, they carry all of the information needed to reconstruct the corresponding original video frame. P frames are "predictive" frames, and they rely on information from a previous I or P frame in order to recreate themselves as a full picture. B frames are "bi-directional" frames that need information from both previous frames and following frames in the video sequence in order to recreate themselves fully.

Figure 3:
FIG. 3 illustrates an example sequence of video frames called a group of pictures (GOP).

Referring to FIG. 3, an example sequence of video frames 300, often called a group of pictures (GOP) 300, is illustrated. The GOP sequence 300 of FIG. 3 is provided by way of example only, and not by way of limitation. In the example GOP sequence 300, there is only a single I frame in every 12 frames of the video sequence, after which the sequence repeats itself. Of the three MPEG video frame types, I frames tend to have more data, because they are able to describe an entire video frame, while B frames are generally the smallest, as they require information from surrounding frames before they can be displayed. The relative size of I, P and B frames is generally reflected in their frequency of use in a GOP sequence.

Referring again to FIG. 2, assume that player application 204 requests media content 200 from host device 102, and that the GOP sequence 300 of FIG. 3 represents a portion of that content being streamed to playback device 104 from host device 102. Under favorable network conditions, where there is no congestion and sufficient bandwidth is available on network 106, the data packets representing GOP sequence 300 will arrive at playback device 104 and be stored in video buffer 206(2) as video frame data 208. In addition, audio data 209 from the media content 200 that corresponds with the video frame data 208 will be stored in audio buffer 206(1).

Buffer monitor 210 on playback device 104 is configured to monitor the fullness level of audio buffer 206(1) and to generate buffer fullness reports while media content 200 is being streamed from host device 102. Monitoring the fullness level of the audio buffer 206(1) provides an indication of the fullness level of the video buffer. Under favorable network conditions, the audio buffer 206(1) fullness level would be high (e.g., >80% full) and would indicate that the video buffer 206(2) is also maintaining a healthy fullness level. A high fullness level in the video buffer 206(2) generally permits real time playback of all the video frames in the GOP sequence 300 and the remaining streaming media content by player application 204. In general, the present embodiment provides for a seamless audio experience. Thus, there is no intentional dropping of audio data, and the fullness level of the audio buffer 206(1) provides an accurate indication of network bandwidth availability. As discussed more fully below, however, different types of video frames may be dropped from the media stream and then reintroduced. This intentional dropping and reintroducing of video frame types causes the video buffer 206(2) fullness level to vary for reasons not solely based on network conditions. Thus, monitoring the fullness level of the video buffer 206(2) would not provide an accurate indication of network conditions. Accordingly, the buffer monitor 210 monitors the fullness level of the audio buffer 206(1) and generates buffer fullness reports that provide an indication of network bandwidth availability while media content 200 is being streamed from host device 102. The buffer fullness reports 202 are a mechanism by which the playback device 104 reports audio buffer fullness to the host device 102. In general, and as discussed more fully below, this information is used by the transrate manager 212 on host device 102 to gauge the performance of the network 106 and determine if there is network bandwidth limitation.

Buffer fullness reports 202 include timestamp information and information on the fullness of audio buffer 206(1). One well-known protocol by which buffer fullness reports 202(1) may be transmitted is RTCP (Real Time Control Protocol). RTCP is a control Protocol that works in conjunction with RTP (Real Time Protocol) to transmit real-time data, such as audio, and video over a network. RTCP control packets are periodically transmitted between participants in an RTP session. RTCP control packets are one way that buffer fullness reports 202(1) may be transmitted over network 106 from playback device 104 to host device 102.

Buffer monitor 210 generally sends buffer fullness reports 202(1) to host device 102 (202(2)) on a periodic basis, such as one report every second or every ¼ second. However, buffer monitor 210 may also send buffer fullness reports 202(1) to host device 102 at a varying rate depending on the level of buffer fullness. For example, provided network conditions are favorable and the audio buffer 206(1) is healthy (e.g., >80% full), as discussed above, buffer monitor 210 may send buffer fullness reports 202(1) to host device with a low frequency (e.g., 1 report per second). However, when the audio buffer health degrades (e.g., <80% full, <60% full, <40% full, etc.), buffer monitor 210 may increase the frequency of buffer fullness reports 202. In such a scenario, the buffer monitor 210 would maintain the increased frequency of buffer fullness reports 202 until the audio buffer 206(1) has recovered back to a healthy level, such as a threshold level of >80% full.

Transrate manager 212 on host device 102 receives the buffer fullness reports 202(2) and monitors the fullness of audio buffer 206(1) as a general gauge of network bandwidth availability. As noted above, buffer fullness reports 202 are only one example of how transrate manager 212 on host device 102 might gauge the level of network bandwidth availability, and other ways of providing information regarding network bandwidth availability are contemplated by this disclosure as being able to provide similar benefits.

To the extent that the buffer fullness reports 202(2) indicate the audio buffer 206(1) is being depleted, the transrate manager 212 can determine whether there is a network bandwidth problem and how severe the problem may be. Transrate manager 212 can then respond accordingly to exclude one or more types of video frames and lower the bit-rate of the media stream. Transrate manager 212 may monitor the buffer fullness reports 202(2) in various ways to determine when audio buffer 206(1) is being depleted. For example, transrate manager 212 may plot the fullness data from the buffer fullness reports 202(2) and monitor the slope of the plotted line.

Figure 4:
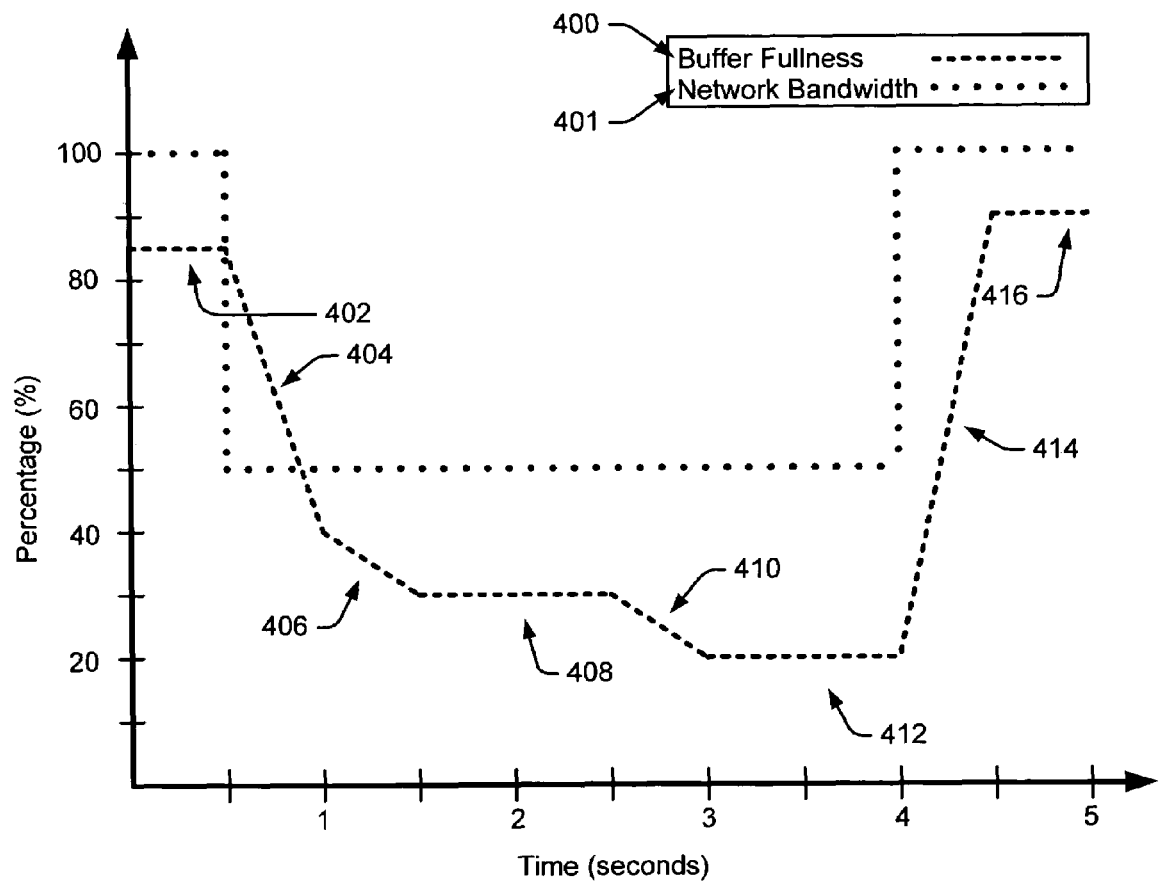
FIG. 4 illustrates an exemplary plot of the percent of fullness of a media buffer versus time, as a host device transmits streaming media content over a network to a playback device.

FIG. 4 illustrates a chart showing an exemplary buffer fullness plot 400, which indicates a rate of depletion and recovery of audio buffer 206(1) as well as the percent of fullness of audio buffer 206(1) over time (i.e., Buffer Fullness plot), as host device 102 transmits streaming media content 200 over network 106 to playback device 104. As discussed below, the buffer fullness plot 400 of FIG. 4 is useful for illustrating 2 different media scenarios. A first media scenario is where the media content 200 being transmitted is from a stored file, and a second media scenario is where the media content being transmitted is live content. The FIG. 4 chart also shows an exemplary network bandwidth plot 401 indicating an exemplary change in network bandwidth availability over the same time interval. Thus, FIG. 4 provides an example of how the fullness level of audio buffer 206(1) might change with respect to a changing network bandwidth. The FIG. 4 chart shows just one example of how transrate manager 212 may monitor the buffer fullness reports 202(2). For example, at time interval 402 (i.e., 0 to 0.5 seconds), the buffer fullness plot 400 shows that the information from one or more buffer fullness reports 202(2) received by transrate manager 212 indicates that the percent of fullness in the audio buffer 206(1) on playback device 104 is remaining steady at approximately 85%. The rate of buffer depletion is zero at this interval. The network bandwidth plot 401 for the same time interval indicates a healthy (e.g., 100%) bandwidth availability. Note that buffer fullness plot 400 of FIG. 4 is not intended to indicate how many buffer fullness reports 202(2) are providing information to the transrate manager 212 each second. However, as indicated above, during times when the audio buffer 206(1) is relatively full (e.g., >80% full), there may be fewer reports being transmitted from the playback device 104 to the host device 102 than when the audio buffer 206(1) is low and/or being depleted.

At time interval 404 (i.e., 0.5 to 1.0 seconds) the buffer fullness plot 400 shows that buffer fullness reports 202(2) indicate that the percent of fullness in the audio buffer 206(1) on playback device 104 is dropping rapidly. There is a negative depletion rate of the fullness level of audio buffer 206(1). Not surprisingly, the network bandwidth plot 401 for the same time interval indicates a drop in bandwidth availability (e.g., from 100% to 50%). At time interval 406, the percent of buffer fullness continues to drop, but not at quite the rate as in the previous time interval. At time interval 408, the percent of buffer fullness has stopped dropping, and remains at about 30%. In a similar manner, the remaining time intervals in FIG. 4 (410, 412, 414, and 416) illustrate example changes in the percent of fullness and rates of depletion and/or recovery of audio buffer 206(1). Note that the network bandwidth plot 401 shows a reduced bandwidth availability from interval 404 through interval 412, after which the network bandwidth availability jumps back up to 100%.

Figure 5:
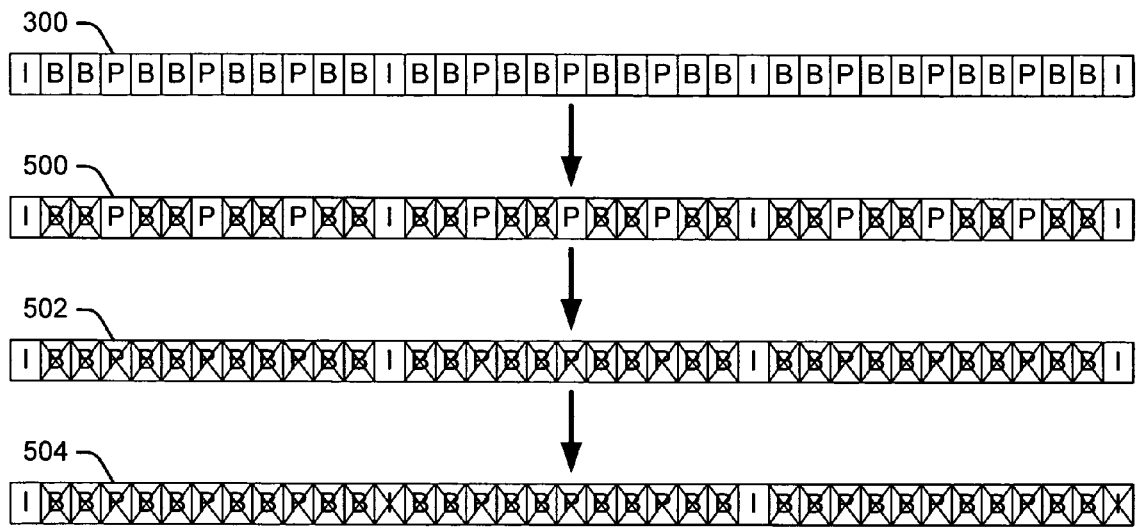
FIG. 5 illustrates an example GOP video frame sequence and how such a frame sequence may be altered by transration.
Figure 6:
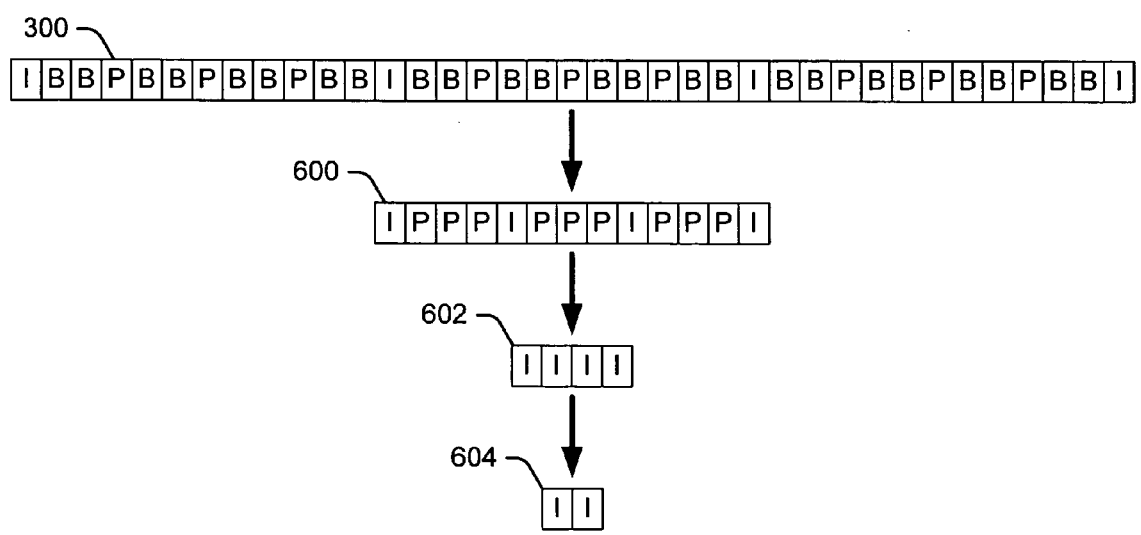
FIG. 6 illustrates an example GOP video frame sequence and how such a frame sequence may be altered by transration.
Figure 7:
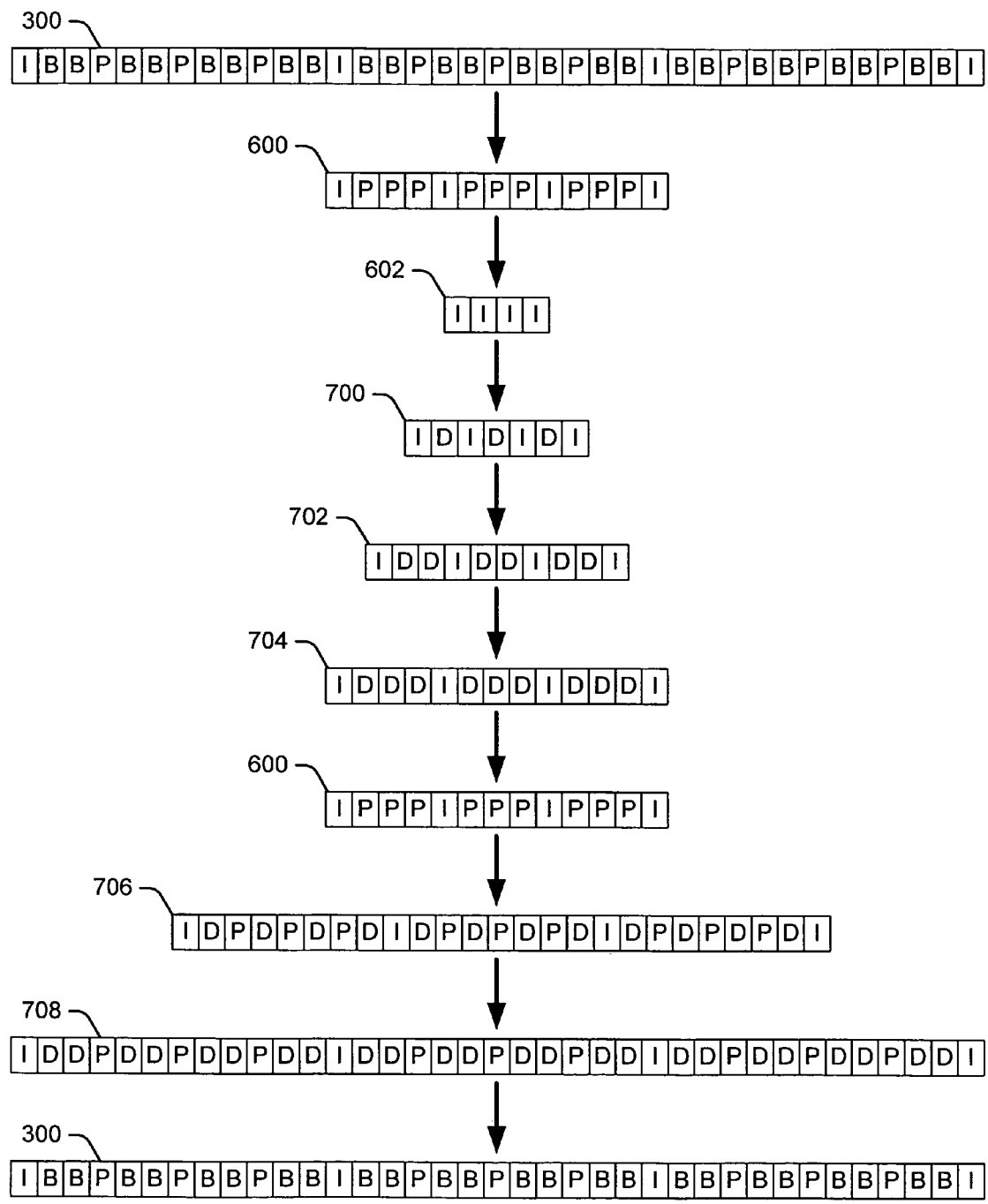
FIG. 7 illustrates an example GOP video frame sequence and how such a frame sequence may be altered by transration.

FIGS. 5, 6, and 7 illustrate the example GOP video frame sequence 300 of FIG. 3, and how such a frame sequence might be altered by the transrate manager 212 and transrater 214 on host device 102 in response to changes in the fullness level of audio buffer 206(1) on playback device 104. In general, FIGS. 5, 6, and 7 illustrate how transrater 214 selectively drops different frame types (i.e., B, P, and I frames) as directed by transrate manager 212 in response to buffer fullness reports 202. FIGS. 5, 6, and 7 are described below with reference to the chart of FIG. 4, which is useful in illustrating the rate of change of fullness levels as well as the absolute changes in fullness levels of audio buffer 206(1) to which the transrate manager 212 and transrater 214 respond. For example, transrate manager 212 may respond to drop different frame types when the depletion rate of the audio buffer 206(1) reaches a certain minimum threshold value.

Video frame sequence 500 of FIG. 5 illustrates how B frames may be selectively dropped from a stream of media content, such as GOP video frame sequence 300, in response to buffer fullness reports 202(2) that indicate audio buffer 206(1) is being depleted. The transrate manager 212 can respond to threshold levels in both the rate of change of buffer level fullness and the absolute value of buffer level fullness as indicated by buffer fullness reports 202(2). There is an indication that audio buffer 206(1) is being depleted at time interval 404 of plot 4, as discussed above regarding FIG. 4. In this scenario, transrate manager 212 receives one or more buffer fullness reports 202(2) that indicate a drop (i.e., depletion) in fullness level of audio buffer 206(1), as shown at time interval 404. Such drops in buffer fullness are considered to result from congestion on the network 106 which, in turn, limits network bandwidth availability as shown by network bandwidth plot 401.

In response to such drops in media buffer 206 fullness, the transrate manager 212 instructs transrater 214 to selectively drop certain types of video frames from media content prior to transmitting/streaming the content. Transrater 214 can alter how it streams the media content from a full frame transmission level to a reduced frame transmission level, thus changing (i.e., lowering) the bit-rate of the streaming media content. Depending on the severity of the rate of depletion of audio buffer 206(1) (as indicated, for example, by the slope of plot 400), transrate manager 212 may instruct transrater 214 to selectively drop different types of video frames to various reduced frame transmission levels. Frame types may be selectively dropped one level at a time, or several levels may be dropped at once, depending again on the severity of the depletion of audio buffer 206(1). The reduced frame transmission levels include an "I and P frame level" 500 (i.e., all B type frames are dropped), an "I frame only level" 502 (i.e., all B and P type frames are dropped), and an "nth I frame level" 504 (i.e., all B and P type frames are dropped along with every nth I frame being dropped). Each drop in frame type to a different reduced frame transmission level provides a corresponding drop in the bit-rate of the streaming media content.

Thus, referring again to FIG. 4, when the transrate manager 212 determines the audio buffer 206(1) is being depleted, such as at time interval 404, it may respond by instructing transrater 214 to reduce the video frame transmission level from the full "I, P, and B frame level" 300, to the "I and P frame level" 500, by selectively dropping the B type video frames. This response might result in a reduction of the depletion rate of the audio buffer 206(1), as shown at time interval 406 of FIG. 4. A further dropping of video frames to the "I frame only level" 502 (i.e., all B and P type frames are dropped) may result in stopping the depletion of the audio buffer 206(1), as shown at time interval 408 of FIG. 4.

FIG. 6 provides a clearer illustration of some of the reduced frame transmission levels shown in FIG. 5, where the dropped types of video frames have been removed from the frame sequences rather than just being crossed out as in FIG. 5.

Accordingly, in the "I and P frame level" 600, all B type frames have been dropped and are not shown; in the "I frame only level" 602, all B and P type frames have been dropped and are not shown; and in the "nth I frame level" 604, all B and P and nth I frames (i.e., "alternate" I frames in this example) have been dropped and are not shown.

FIG. 7 illustrates a progression of frame sequences (i.e., 300, 600, and 602) similar to that shown in FIG. 6 where the bit-rate of streaming media content has been dropped to reduced frame transmission levels by selectively dropping frame types from the streaming content as the audio buffer 206(1) is depleted. In addition, FIG. 7 also shows how the transrate manager 212 and transrater 214 test the network 106 after the streaming media content has been dropped to reduced frame transmission levels, and further, how dropped frame types are reintroduced back into the streaming media content to recover reduced frame transmission levels. The network 106 is tested to determine if its bandwidth availability has recovered enough to handle reintroducing dropped frame types back into the streaming media content without causing further depletion of the audio buffer 206(1). Without testing the network 106 for sufficient bandwidth, jumping up the transmission level of the media stream (e.g., from the "I frame only level" 602 to the "I and P frame level" 600) can cause a sudden depletion of the audio buffer 206(1) that could empty the video buffer 206(2) and cause a pause in video playback on playback device.

Referring again to FIG. 4, once the transrate manager 212 determines that depletion of the audio buffer 206(1) has been stopped, as shown at time interval 408, it can instruct the transrater 214 to insert padding data packets (shown as "D" frames in FIG. 7) into the streaming media content at an increasing rate until one of two outcomes is detected, as discussed below. The padding data packets ("D" frames) are dummy packets that do not contain video data. Rather, they contain garbage data that simply raises the bit-rate of the media stream as the padding packets are introduced.

If the network 106 is still congested (i.e., bandwidth limited), introducing an increasing number of padding data packets into the media stream will eventually result in a further depletion of the audio buffer 206(1). This occurs because the padding data packets eat up scarce network bandwidth, which further reduces the amount of audio data 209 that makes it into the audio buffer 206(1). Note that the padding data packets are not stored in the buffer(s) 206, and therefore have no other effect on the audio buffer fullness level other than reducing the amount of audio data 209 that makes it into the audio buffer 206(1) during times of network congestion. This first possible outcome is illustrated, for example, in FIG. 4 at time interval 410, where the transrate manager 212 determines that an introduction of padding data packets has caused further depletion of the audio buffer 206(1). In this case, the transrate manager 212 stops introducing padding data packets to prevent further depletion of the audio buffer 206(1), as illustrated in FIG. 4 at time interval 412.

A second possible outcome of introducing an increasing number of padding data packets into the media stream occurs when the network bandwidth availability has recovered. Under this circumstance, introducing an increasing number of padding data packets into the media stream will eventually result in the host device 102 outputting a stream of media content and padding data whose combined bit-rate is equal to the bit-rate of the next highest video frame transmission level. In addition, the fullness level of audio buffer 206(1) will not be further reduced (and may increase), because the network has enough bandwidth to handle the padding data packets as well as the stream of media content. Once the transrate manager 212 determines there is enough network bandwidth available to handle both the padding data packets and the current level of video frame transmission, it can bump up the video frame transmission level (e.g., from the "I frame only level" 602 to the "I and P frame level" 600) with confidence that there will be no further depletion of the audio buffer 206(1). This second possible outcome is illustrated, for example, in FIG. 4 at time interval 412, where the transrate manager 212 determines that an introduction of padding data packets has not caused further depletion of the audio buffer 206(1). In this case, the transrate manager 212 stops introducing padding data packets and bumps up the video frame transmission level (e.g., from the "I frame only level" 602 to the "I and P frame level" 600). In general, previously excluded types of video frames will be reintroduced to the media stream upon a determination that there is adequate network bandwidth availability.

If the media content being transmitted is file content (i.e., the first media scenario mentioned above) that can be transmitted at a rate greater than the 1× playback rate, then bumping up the video frame transmission level may cause the audio buffer 206(1) to recover in fullness level, as illustrated in FIG. 4 at time intervals 414 and 416. However, if the media content is live (i.e., the second media scenario mentioned above), there is no way to transmit the content at a rate that is greater than the 1× playback rate, and thus, the fullness level of the audio buffer 206(1) could not increase past the level to which it was previously depleted. Therefore, the level would remain at that shown at interval 412.

FIG. 7 illustrates the gradual increase of padding data packets to test the network for bandwidth availability. For example, from the "I frame only" transmission level 602, padding data packets ("D" frames) are added into the stream of media content in increasing numbers, as illustrated in video sequence 700 and video sequence 702. Once the transrate manager 212 determines there is enough network bandwidth available to handle both the "I frame only" transmission level 602 and the padding data packets, it reintroduces previously excluded types of video frames to bump up the video frame transmission level from the "I frame only level" 602 to the "I and P frame level" 600. In a similar manner, the transrate manager 212 bumps up the video frame transmission level from the "I and P frame level" 600 to the full "I, P, and B frame level" 300 once it determines that the network 106 is capable of handling the increased bit-rate of padding data packets introduced in video sequences 706 and 708.

At reduced video frame transmission levels, as noted above, all audio data packets continue to be transmitted by host device 102 and played by playback device 104. This maintains a consistent audio experience for the user and is possible because of the relatively low bit-rate of the audio data. The video experience can be maintained on playback device 104 even at reduced video frame transmission levels by duplicating and/or persisting video frames in the media buffer 206. Duplicating and persisting video frames is well-known and will not be further discussed. Such a process coupled with the buffer fullness monitoring, the buffer fullness reports 202, and the selective frame dropping on the host device 102, provide a real time video experience that is relatively stable throughout playback even in the midst of significant network congestion.

Exemplary Methods

Figure 8:
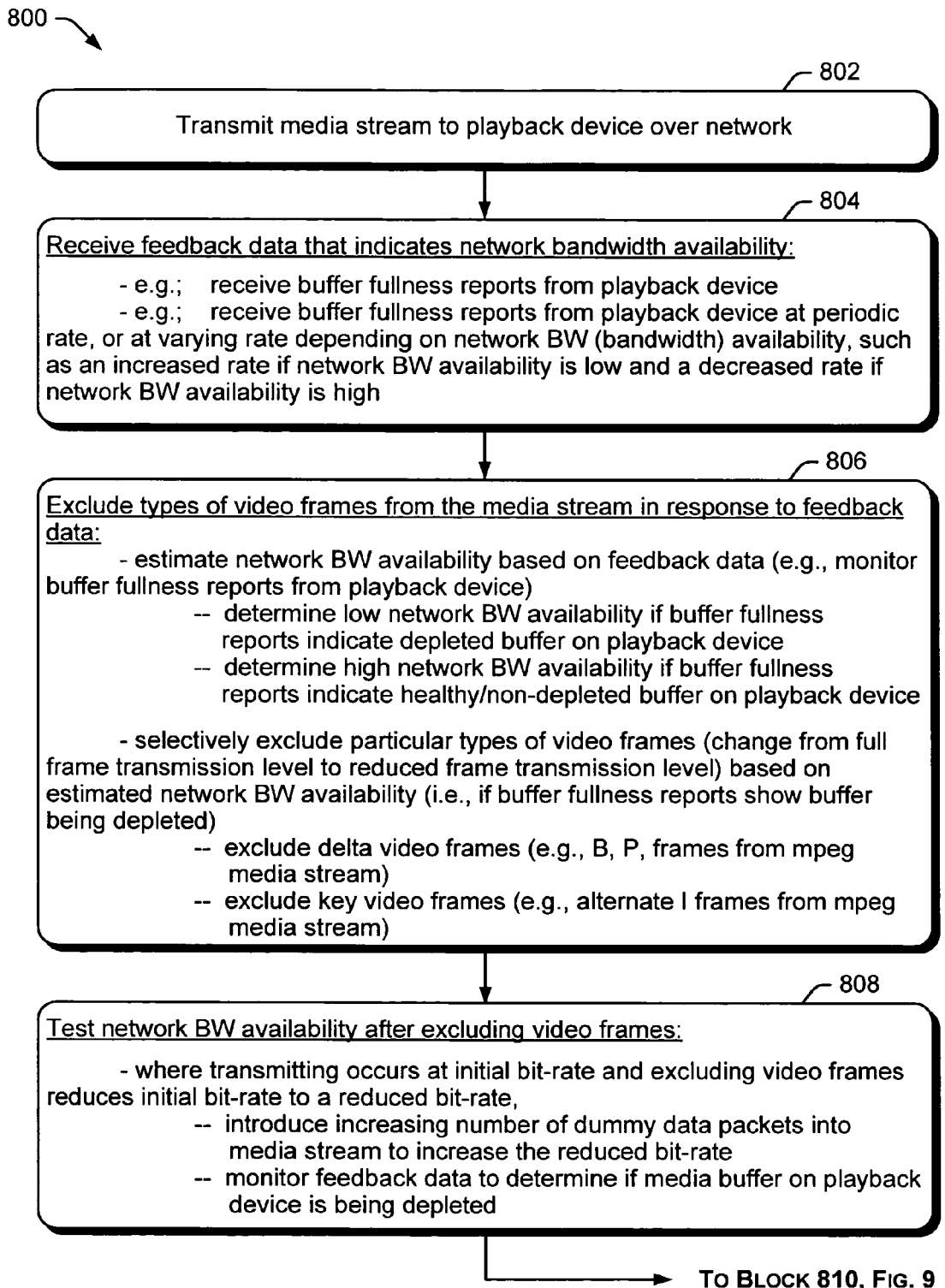
FIGS. 8-10 are flow diagrams illustrating exemplary methods for transrating media content being streamed over a network from a host computer device to a playback computer device.

Example methods for transrating (i.e., bit-rate converting) media content being streamed over a network 106 from a host computer device 102 to a playback computer device 104 will now be described with primary reference to the flow diagrams of FIGS. 8, 9, and 10. The methods apply to the exemplary embodiments discussed above with respect to FIGS. 1-7. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

At block 802 of method 800, a media stream is transmitted to a media playback device 104 over a network 106. The media stream is transmitted from a host device 102 and includes audio/video and/or video content. At block 804, the host device 102 receives feedback data regarding network bandwidth availability. Such feedback data may come from various sources, such as, for example, a server monitoring data flow over the network 106. One more specific example of such feedback data is buffer fullness reports 202 received from the playback device 104. Buffer fullness reports 202 include information indicating the level of fullness of an audio buffer 206(1) on the playback device 104.

Buffer fullness reports 202 may be received periodically, such as once every second, or they may be received at a varying rate where the varying rate depends on the network bandwidth availability. For example, under favorable network bandwidth conditions, the audio buffer 206(1) on playback device 104 is healthy (e.g., >80% full) and a buffer monitor 210 on the playback device 104 may send buffer fullness reports 202 to host device 102 at a low frequency (e.g., 1 report per second). However, when there is network congestion and network bandwidth availability is limited, the buffer health may degrade (e.g., <80% full, <60% full, <40% full, etc.) and the buffer monitor 210 may increase the frequency of buffer fullness reports 202. Increasing the frequency with which the host device 102 receives buffer fullness reports 202 allows the host device 102 to discover such network bandwidth limitations sooner and respond more quickly.

At block 806 of method 800, host device 102 excludes certain types of video frames from the media stream in response to the feedback data (i.e., the buffer fullness reports 202). A transrate manager 212 on host device 102 estimates network bandwidth availability based on the buffer fullness levels indicated in the buffer fullness reports 202. That is, low network bandwidth is determined from buffer fullness reports that indicate a depleted audio buffer 206(1), while healthy or high network bandwidth is determined from buffer fullness reports that indicate that the audio buffer 206(1) is healthy or not depleted (e.g., >80% full).

Excluding types of video frames from the media stream is to selectively exclude particular types of video frames (e.g., delta video frames, key video frames) based on the estimation of available network bandwidth. Excluding types of video frames from the media stream changes the transmission of the media stream from a full frame transmission level (i.e., wherein all types of video frames are transmitted) to a reduced frame transmission level (i.e., wherein less than all the types of video frames are transmitted). Thus, when the transrate manager 212 on host device 102 determines the audio buffer 206(1) is being depleted, it may respond by instructing transrater 214 to reduce the video frame transmission level from the full "I, P, and B frame level" 300, to the "I and P frame level" 500, by selectively dropping the B type video frames (FIGS. 4-6). Further exclusions of types of video frames include, for example, transmitting an "I frame only level" 502, where all B and P delta type frames are excluded, and an "nth I frame level" 604, where all B and P delta type frames and nth I type frames are excluded.

At block 808 of method 800, network bandwidth availability is tested after certain types of video frames are excluded from the media stream. Initially, transmission occurs at a full frame transmission level (i.e., wherein all types of video frames are transmitted), and at an initial bit-rate. By excluding certain types of video frames, transmission occurs at a reduced frame transmission level, and at a reduced bit-rate. To test network bandwidth availability after types of video frames have been excluded, an increasing number of padding data packets is introduced (i.e., by transrater 214 as directed by transrate manager 212) into the media stream that is being transmitted at a reduced frame transmission level. The padding data packets increase the reduced bit-rate of the media stream. The feedback data (i.e., buffer fullness reports 202) is continually monitored during the introduction of padding data packets to determine if the buffer(s) 206 on the playback device 104 is being depleted.

Figure 9:
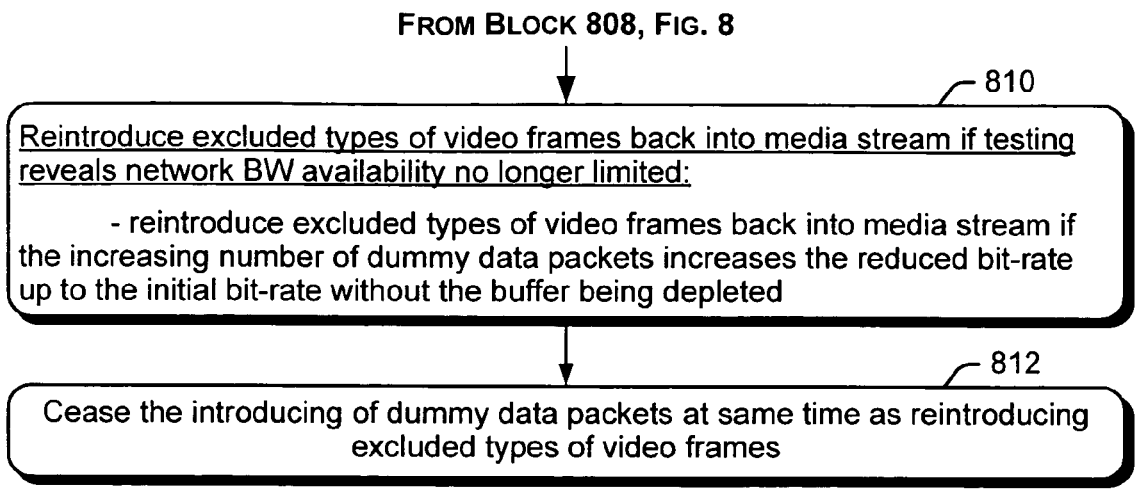

The method 800 continues in FIG. 9 at block 810. At block 810, excluded types of video frames are reintroduced into the media stream if the testing reveals that the network bandwidth is no longer limited. That is, if the introduction of an increasing number of padding data packets increases the reduced bit-rate back up to the initial bit-rate without depleting the audio buffer 206(1), then the host device 102 (transrate manager 212) knows that the network bandwidth is sufficient to handle the initial bit-rate again. Therefore, the transrater 214 (as directed by transrate manager 212) reintroduces the excluded types of video frames back into the media stream. Note that this reintroduction may involve the reintroduction of various levels or types of video frames (e.g., nth I frames, P frames, B frames; P and B frames; etc.), depending on what the current reduced frame transmission level is. In this regard, also note that the "initial bit-rate" might also be the bit rate of the next highest reduced frame transmission level, rather than the full frame transmission level. Thus, where several levels or types of video frames have been excluded, these excluded types of video frames can also be reintroduced to the media stream one level or type at a time with initial bit-rate simply being the bit-rate of the next highest reduced frame transmission level.

At block 812, the method 800 shows that the introduction of padding data packets is terminated at the same time that excluded types of video frames are reintroduced to the media stream.

Figure 10:
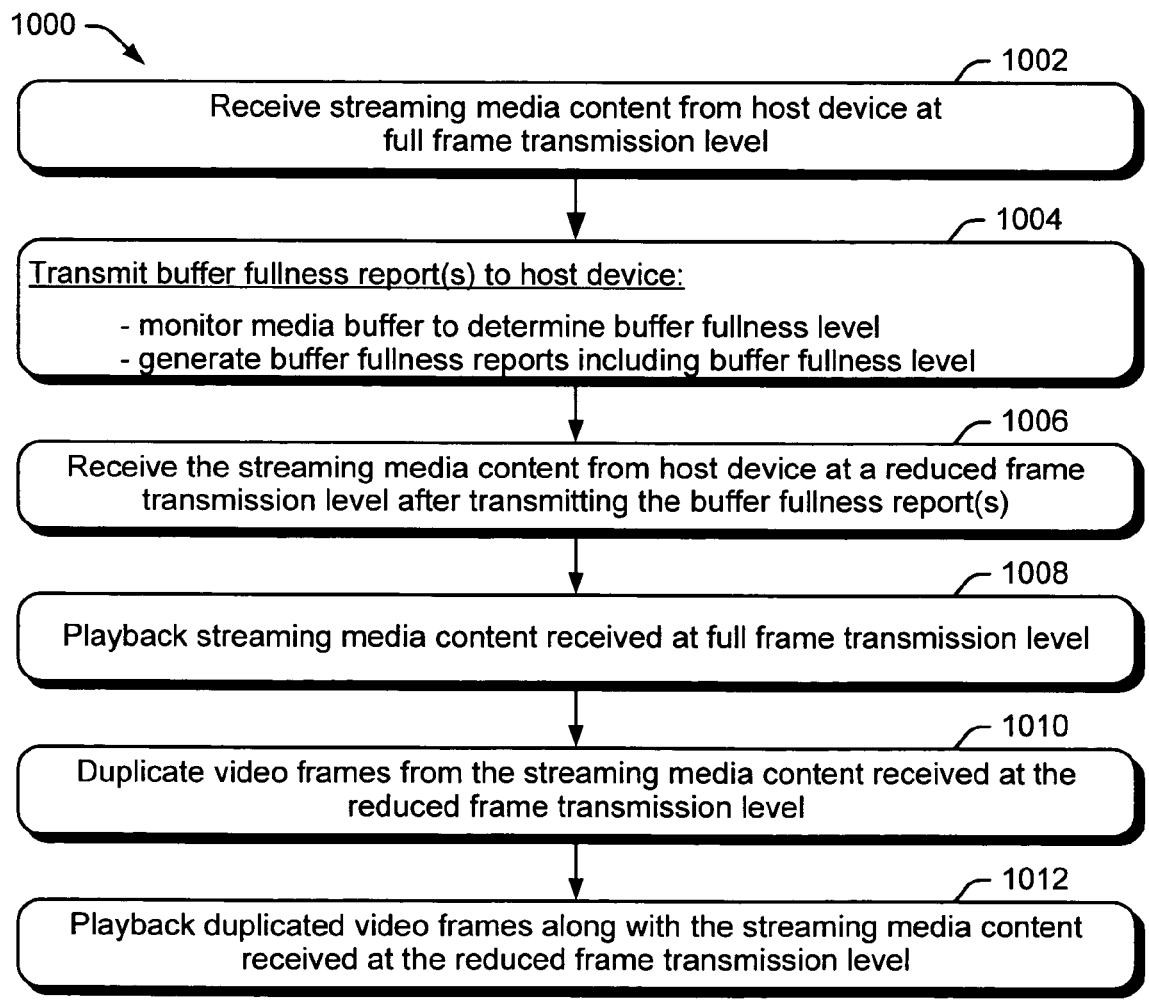

FIG. 10 is a flow diagram illustrating an alternate method 1000 as performed from the playback device 104 for transrating (i.e., bit-rate converting) media content being streamed over network 106 from host computer device 102 to playback device 104. At block 1002 of method 1000, playback device 104 receives streaming media content from host device 102 at a full frame transmission level (i.e., where all types of video frames in the media content are transmitted). At block 1004, playback device 104 transmits buffer fullness reports to the host device 102. A buffer monitor 210 on playback device 104 monitors the audio buffer 206(1) to determine its level of fullness of data. Buffer monitor 210 generates buffer fullness reports which include the information on the fullness level of the buffer.

At block 1006, after transmitting the buffer fullness reports, the playback device 104 begins receiving the streaming media content at a reduced frame transmission level (i.e., one or more types of video frames have been excluded). Note that this would result from the host device 102 determining from the buffer fullness reports 202, that the audio buffer 206(1) is being depleted, and that there is likely a network bandwidth limitation problem.

At block 1008, a player application 204 on playback device 104 plays back the streaming media content received at the full frame transmission level. Player application 204 may also duplicate video frames from the streaming media content received at the reduced frame transmission level as shown at block 1010. At block 1012, player application 204 on playback device 104 plays back the duplicated video frames along with the streaming media content received at the reduced frame transmission level.

Exemplary Computing Environment

Figure 11:
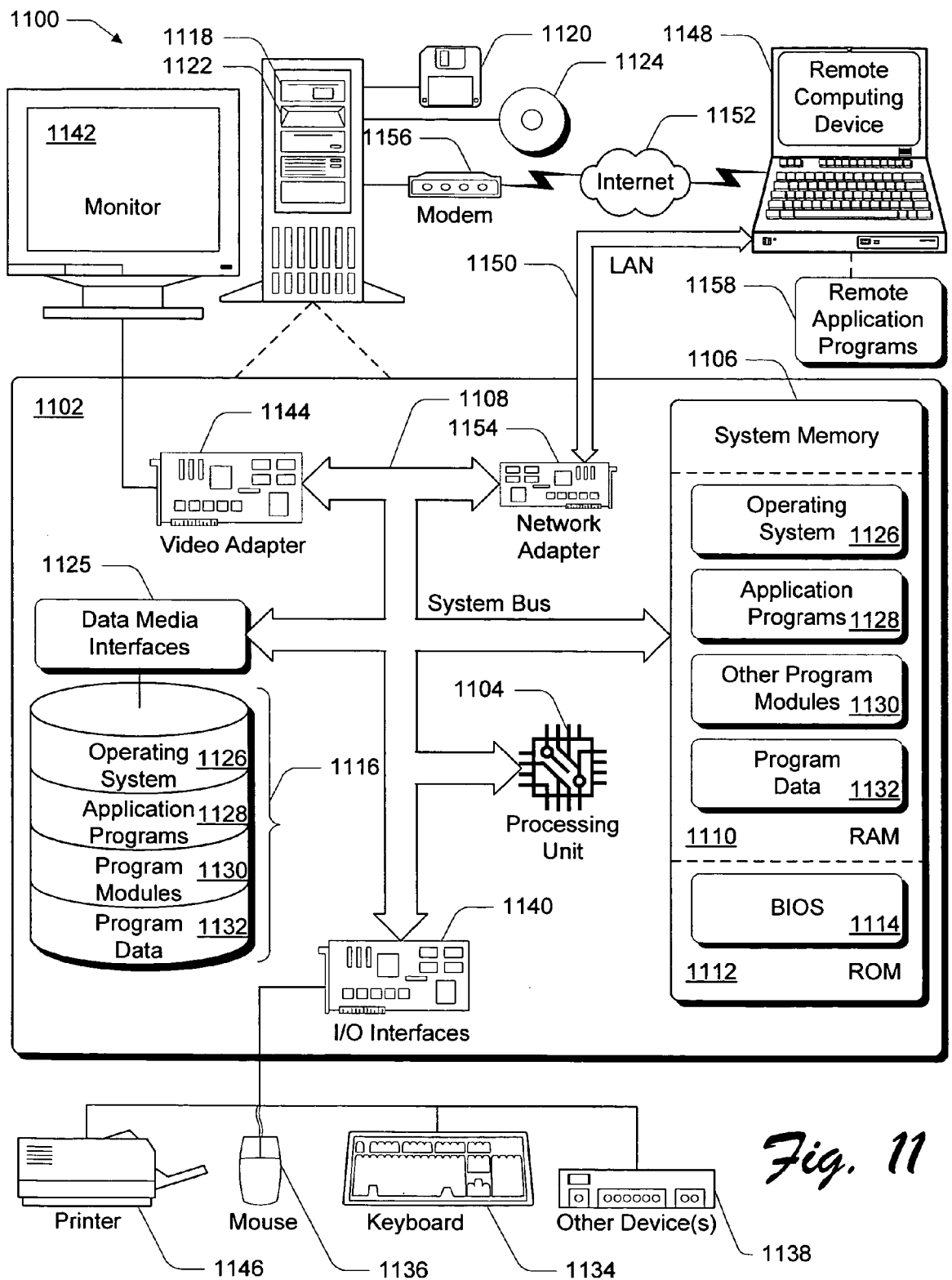
FIG. 11 illustrates an exemplary computing environment suitable for implementing a host computer device and playback computer device such as those discussed with reference to FIGS. 1-10.

FIG. 11 illustrates an exemplary computing environment suitable for implementing computer devices such as a host device 102 and a playback device 104 as discussed above with reference to FIGS. 1-10. Although one specific configuration is shown in FIG. 11, such computing devices may be implemented in other computing configurations.

The computing environment 1100 includes a general-purpose computing system in the form of a computer 1102. The components of computer 1102 may include, but are not limited to, one or more processors or processing units 1104, a system memory 1106, and a system bus 1108 that couples various system components including the processor 1104 to the system memory 1106.

The system bus 1108 represents one or more of any of several types of bus structures, including a memory bus or memory controller, a peripheral bus, an accelerated graphics port, and a processor or local bus using any of a variety of bus architectures. An example of a system bus 1108 would be a Peripheral Component Interconnects (PCI) bus, also known as a Mezzanine bus.

Computer 1102 includes a variety of computer-readable media. Such media can be any available media that is accessible by computer 1102 and includes both volatile and non-volatile media, removable and non-removable media. The system memory 1106 includes computer readable media in the form of volatile memory, such as random access memory (RAM) 1110, and/or non-volatile memory, such as read only memory (ROM) 1112. A basic input/output system (BIOS) 1114, containing the basic routines that help to transfer information between elements within computer 1102, such as during start-up, is stored in ROM 1112. RAM 1110 contains data and/or program modules that are immediately accessible to and/or presently operated on by the processing unit 1104.

Computer 1102 may also include other removable/non-removable, volatile/non-volatile computer storage media. By way of example, FIG. 11 illustrates a hard disk drive 1116 for reading from and writing to a non-removable, non-volatile magnetic media (not shown), a magnetic disk drive 1118 for reading from and writing to a removable, non-volatile magnetic disk 1120 (e.g., a "floppy disk"), and an optical disk drive 1122 for reading from and/or writing to a removable, non-volatile optical disk 1124 such as a CD-ROM, DVD-ROM, or other optical media. The hard disk drive 1116, magnetic disk drive 1118, and optical disk drive 1122 are each connected to the system bus 1108 by one or more data media interfaces 1125. Alternatively, the hard disk drive 1116, magnetic disk drive 1118, and optical disk drive 1122 may be connected to the system bus 1108 by a SCSI interface (not shown).

The disk drives and their associated computer-readable media provide non-volatile storage of computer readable instructions, data structures, program modules, and other data for computer 1102. Although the example illustrates a hard disk 1116, a removable magnetic disk 1120, and a removable optical disk 1124, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1116, magnetic disk 1120, optical disk 1124, ROM 1112, and/or RAM 1110, including by way of example, an operating system 1126, one or more application programs 1128, other program modules 1130, and program data 1132. Each of such operating system 1126, one or more application programs 1128, other program modules 1130, and program data 1132 (or some combination thereof) may include an embodiment of a caching scheme for user network access information.

Computer 1102 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1102 via input devices such as a keyboard 1134 and a pointing device 1136 (e.g., a "mouse"). Other input devices 1138 (not shown specifically) may include a microphone, joystick, game pad, satellite dish, serial port, scanner, and/or the like. These and other input devices are connected to the processing unit 1104 via input/output interfaces 1140 that are coupled to the system bus 1108, but may be connected by other interface and bus structures, such as a parallel port, game port, or a universal serial bus (USB).

A monitor 1142 or other type of display device may also be connected to the system bus 1108 via an interface, such as a video adapter 1144. In addition to the monitor 1142, other output peripheral devices may include components such as speakers (not shown) and a printer 1146 which can be connected to computer 1102 via the input/output interfaces 1140.

Computer 1102 may operate in a networked environment using logical connections to one or more remote computers, such as a remote computing device 1148. By way of example, the remote computing device 1148 can be a personal computer, portable computer, a server, a router, a network computer, a peer device or other common network node, and the like. The remote computing device 1148 is illustrated as a portable computer that may include many or all of the elements and features described herein relative to computer system 1102.

Logical connections between computer 1102 and the remote computer 1148 are depicted as a local area network (LAN) 1150 and a general wide area network (WAN) 1152. Such networking environments are commonplace in offices, enterprise-wide computer networks, intranets, and the Internet. When implemented in a LAN networking environment, the computer 1102 is connected to a local network 1150 via a network interface or adapter 1154. When implemented in a WAN networking environment, the computer 1102 includes a modem 1156 or other means for establishing communications over the wide network 1152. The modem 1156, which can be internal or external to computer 1102, can be connected to the system bus 1108 via the input/output interfaces 1140 or other appropriate mechanisms. It is to be appreciated that the illustrated network connections are exemplary and that other means of establishing communication link(s) between the computers 1102 and 1148 can be employed.

In a networked environment, such as that illustrated with computing environment 1100, program modules depicted relative to the computer 1102, or portions thereof, may be stored in a remote memory storage device. By way of example, remote application programs 1158 reside on a memory device of remote computer 1148. For purposes of illustration, application programs and other executable program components, such as the operating system, are illustrated herein as discrete blocks, although it is recognized that such programs and components reside at various times in different storage components of the computer system 1102, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
transmitting a media stream over a network from a first device to a playback device, said media stream including audio content and video content, said playback device having a buffer receiving the audio content and the video content;
receiving feedback data at the first device that indicates a fullness level of the buffer at the playback device;
excluding video frames from the media stream during the transmitting of the video content in response to the feedback data when a depletion rate of the buffer reaches a predetermined minimum threshold;
following the excluding of the video frames from the media stream, receiving a feedback report indicating that the buffer fullness level is increasing;
testing bandwidth availability of the network as a result of receiving the feedback report following the excluding of the video frames from the media stream, by sending over the network, to the playback device, padding data packets as part of the media stream that are not added to the buffer to determine whether to stop the excluding of the video frames from the media stream;
using the padding data packets for testing the network bandwidth availability after the excluding of the video frames, wherein said padding data packets are not stored in the buffer; and
reintroducing excluded types of video frames back into the media stream when a result of the testing reveals that the audio buffer fullness level is not further depleted by the padding data packets, whereby the testing avoids sudden depletion of the buffer caused by reintroducing the excluded video frames,
wherein, as a result of the testing, the padding data packets are gradually increased to a bandwidth level corresponding to reintroduction of a first type of video frames to the media stream,
wherein following the reintroduction of the first type of video frames to the media stream, the padding data packets are gradually increased to a bandwidth level corresponding to reintroduction of a second type of video frames to the media stream.

2. A method as recited in claim 1, wherein the excluding video frames comprises:
determining the buffer fullness level based on the feedback data, wherein the buffer fullness level indicates an amount of data present in the buffer; and
selectively excluding particular types of video frames from the media stream based on the buffer fullness level.

3. A method as recited in claim 2, wherein the feedback data comprises buffer fullness reports from the playback device, and further comprising:
determining that one or more types of frames should be excluded from the video stream when the buffer fullness reports indicate that the buffer on the playback device is being depleted, based upon a severity of depletion; and
determining that network bandwidth availability should be tested if the buffer fullness reports indicate the buffer on the playback device is not being depleted.

4. A method as recited in claim 2, wherein the selectively excluding particular types of video frames comprises:
a first step of excluding a first type of video frames a when the fullness level falls to a predetermined first point;
a second step of excluding the first type and a second type of video frames when the fullness level of the buffer continues to be depleted following the first step; and
a third step of excluding the first type, the second type and a third type of video frames when the fullness level of the buffer continues to be depleted following the second step.

5. A method as recited in claim 4, wherein the media stream is an mpeg media stream and the excluding the second type of video frames comprises excluding P (predictive) video frames.

6. A method as recited in claim 4, wherein the media stream is an mpeg media stream and the excluding the third type of video frames comprises excluding every nth I (intra) video frame.

7. A method as recited in claim 2, wherein the selectively excluding particular types of video frames further comprises excluding both delta video frames and key video frames.

8. A method as recited in claim 2, wherein the media stream is an mpeg media stream and the excluding the first type of video frames comprises excluding B (bi-directional) video frames.

9. A method as recited in claim 1, wherein the padding data packets are dummy packets that do not contain video data, wherein the padding data packets raise a bit-rate of the media stream as the padding data packets are introduced.

10. A method as recited in claim 1, wherein the receiving feedback data comprises receiving the buffer fullness reports at a periodic rate from the playback device.

11. A method as recited in claim 1, wherein the receiving feedback data comprises receiving the buffer fullness reports at a varying rate from the playback device, the varying rate depending on a level of fullness of the buffer.

12. A method as recited in claim 11, wherein the receiving the buffer fullness reports at a varying rate comprises:
   receiving buffer fullness reports at an increased rate as the fullness of the buffer decreases; and
   receiving buffer fullness reports at a decreased rate as the fullness of the buffer increases.

13. A method as recited in claim 1, wherein the transmitting the media stream occurs at an initial bit-rate and the excluding video frames reduces the initial bit-rate to a reduced bit-rate, and wherein the testing comprises:
   based upon results of the testing, introducing an increasing number of padding data packets into the media stream to increase the reduced bit-rate, said padding data packets not being stored in the buffer at the playback device;
   monitoring the feedback data to determine if the buffer on the playback device is being depleted due to the introduction of the padding data packets; and
   based upon the monitoring of the feedback data, reintroducing excluded types of video frames back into the media stream if the increasing number of padding data packets increases the reduced bit-rate up to the initial bit-rate without the buffer being further depleted.

14. A method as recited in claim 13, further comprising ceasing the introducing of the padding data packets concurrently with the reintroducing excluded types of video frames.

15. A processor-readable storage medium storing processor-executable instructions, which, when executed by a processor, are configured for performing the method of claim 1.

16. A method for streaming audio and video content in a media stream from a host device over a network to a playback device, the method comprising:
   receiving the streaming audio content at the playback device and storing the audio content in an audio buffer;
   receiving the streaming video content from the host device at a full frame transmission level and storing the video content in a video buffer;
   transmitting an audio buffer fullness report from the playback device to the host device, wherein the audio buffer fullness report indicates an amount of audio data maintained in the audio buffer; and
   receiving the streaming video content from the host device at a reduced frame transmission level in which selected types of video frames are excluded from transmission when the audio buffer fullness report indicates that a depletion rate of audio data maintained in the audio buffer has reached a predetermined threshold, whereby streaming of the video content is controlled based on the fullness level of the audio buffer;
   monitoring the audio buffer to determine the amount of audio data maintained in the audio buffer;
   generating another audio buffer fullness report transmitted to the host device indicating that the amount of audio data maintained in the audio buffer is increasing;
   receiving padding data packets over the network that are not added to the audio buffer or the video buffer as part of testing of network bandwidth availability for determining whether to stop excluding the selected type of video frames from transmission;
   receiving an increasing number of padding data packets in the media stream, said padding data packets not being stored in the audio buffer or the video buffer at the playback device;
   providing additional feedback data showing that the audio buffer on the playback device is not being depleted due to the introduction of the padding data packets; and
   receiving reintroduced excluded types of video frames in the media stream when the increasing number of padding data packets increases the media stream transmission up to a previous level without the audio buffer being further depleted.

17. A method as recited in claim 16, wherein the padding data packets are dummy packets that do not contain video data, wherein the padding data packets raise a bit-rate of the media stream as the padding data packets are introduced.

18. A method as recited in claim 16, further comprising:
   duplicating video frames from the streaming video content received at the reduced frame transmission level; and
   playing back the duplicated video frames in place of the selected types of video frames that were excluded from the transmission.

19. A processor-readable storage medium storing processor-executable instructions, which when executed by a processor are configured to perform steps comprising:
   transmitting a media stream to a playback device over a network, said media stream including audio content and video content, said playback device having a buffer for receiving the media stream;
   receiving buffer fullness reports from the playback device;
   dropping a type of video frame from the media stream if the buffer fullness reports indicate that the buffer on the playback device is being depleted below a predetermined threshold;
   after dropping a type of video frame from the media stream, determining from the buffer fullness reports that the buffer is no longer being depleted;
   testing bandwidth availability of the network to determine if dropped types of video frames can be reintroduced into the media stream without causing further depletion of the buffer by sending over the network, to the playback device, padding data packets that are not added to the buffer to determine whether to reintroduce the dropped types of video frames into the media stream; and
   reintroducing the dropped types of video frames back into the media stream when results of the testing indicate that the reintroducing will not cause further depletion of the buffer,
   wherein, as a result of the testing, the padding data packets are gradually increased to a bandwidth level corresponding to reintroduction of a first type of video frames to the media stream,
   wherein following the reintroduction of the first type of video frames to the media stream, the padding data packets are gradually increased to a bandwidth level corresponding to reintroduction of a second type of video frames.

20. A processor-readable storage medium as recited in claim 19, wherein the dropping a type of video frame comprises changing the transmitting from a full frame transmission level to a reduced frame transmission level.

21. A processor-readable storage medium as recited in claim 20, wherein the full frame transmission level includes I (intra), B (bi-directional), and P (predictive) types of video frames, and the reduced frame transmission level is selected from the group comprising:

I and P video frame transmission level;
I video frame transmission level; and
nth I video frame transmission level.

22. A processor-readable storage medium as recited in claim 21, wherein the dropping a type of video frame from the media stream comprises:

monitoring a fullness value in the buffer fullness reports;
determining that the buffer on the playback device is being depleted; and
changing the transmitting from the full frame transmission level to the I and P video frame transmission level.

23. A processor-readable storage medium as recited in claim 22, wherein the dropping a type of video frame from the media stream further comprises:

continuing the monitoring;
determining that the buffer on the playback device is still being depleted; and
changing the transmitting from the I and P video frame transmission level to the I video frame transmission level.

24. A processor-readable storage medium as recited in claim 23, wherein the dropping a type of video frame from the media stream further comprises:

continuing the monitoring;
determining that the buffer on the playback device is still being depleted; and
changing the transmitting from the I video frame transmission level to the nth I video frame transmission level.

25. A processor-readable storage medium as recited in claim 19, comprising further processor-executable instructions configured for:

introducing the padding data packets as dummy packets that do not contain video data, wherein the padding data packets raise a bit-rate of the media stream as the padding data packets are introduced.

26. A processor-readable storage medium as recited in claim 25, comprising further processor-executable instructions configured for stopping the transmitting of the padding data packets in conjunction with the reintroducing the dropped types of video frames back into the media stream.

27. A processor-readable storage medium as recited in claim 19, wherein the transmitting initially occurs at a first bit rate and the dropping a type of video frame causes the transmitting to occur at a reduced second bit rate, the testing comprising:

during the testing, after determining that the audio buffer is no longer being depleted, transmitting increasing numbers of the padding data packets along with the media stream while monitoring buffer fullness reports; and
when, during the testing, the padding data packets and the media stream being transmitted together raise the second bit rate back up to the first bit rate, reintroducing the dropped types of video frames back into the media stream.

28. A system comprising:

a playback device including an audio buffer and a video buffer, said playback device further including a buffer monitor for monitoring a fullness level of the audio buffer;
a host device in communication with the playback device via a network, said playback device storing media content including video content and audio content for streaming the media content to the playback device;
a transrate manager at the host device for controlling streaming of the media content by a transrater;
wherein, during streaming of the media content from the host device to the playback device the audio buffer at the playback device is configured to receive streaming audio content and the video buffer is configured to receive streaming video content from the host device;
a player application at the playback device is configured to access the audio buffer and the video buffer to playback the streaming media content;
wherein the buffer monitor is configured to monitor a fullness level of the audio buffer by determining an amount of audio data in the audio buffer, and to transmit audio buffer fullness reports to the host device;
wherein the transrate manager is configured to receive the audio buffer fullness reports from the buffer monitor on the playback device and determine a depletion rate of the audio buffer;
wherein when the depletion rate of the audio buffer reaches a predetermined minimum threshold value, the transrate manager responds by instructing the transrater to selectively drop one or more specified types of video frames from the media content prior to streaming the media content to the playback device, whereby the streaming of the video content is controlled in based on the fullness level of the audio buffer;
wherein, following selective dropping of specified types of video frames, when the transrate manager receives subsequent audio buffer fullness reports indicating that the audio buffer is no longer being depleted, the transrate manager is configured to test the network for bandwidth availability by gradually increasing a number of padding data packets added to the streaming media content sent over the network to the playback device, said padding data packets not being stored in the audio buffer or video buffer of the playback device;
wherein, during the testing, when the transrate manager determines, based upon the fullness level of the audio buffer, that there is sufficient network bandwidth available to handle both the padding data packets and a current level of video frame transmission, the transrate manager is configured to increase the level of video frame transmission by including one or more of the specified dropped types of video frames;
wherein the padding data packets are dummy packets that do not contain video data; and
wherein the padding data packets raise a bit-rate of the media stream as the padding data packets are introduced.

29. A system comprising:

a first device storing media content, the media content including audio content and video content;
a transrater at the first device configured to control streaming of the media content in a media stream over the network to a playback device having a buffer; and
a transrate manager configured to exclude video frames from the media stream during the transmitting of the video content in response to feedback data received from the playback device when a depletion rate of the buffer reaches a predetermined minimum threshold,
wherein, following the excluding of the video frames from the media stream, the transrate manager is configured to receive additional feedback data indicating that the buffer fullness level is increasing,
wherein the transrate manager is configured to test the network by sending over the network, to the playback device, padding data packets that are not added to the buffer to determine whether to stop the excluding of the video frames from the media stream, wherein the padding data packets are dummy packets that do not contain video data, wherein the padding data packets raise a bit-rate of the media stream as the padding data packets are introduced, and wherein, during the testing, the transrate manager is further configured to gradually increase an amount of padding data packets sent over the network to a bandwidth level corresponding to reintroduction of a first type of video frames to the media stream, wherein following the reintroduction of the first type of video frames to the media stream, the transrate manager is configured to gradually increase the amount of the padding data packets to a bandwidth level corresponding to reintroduction of a second type of video frames.

* * * * *